United States Patent
Joshi et al.

(10) Patent No.: US 8,959,201 B2
(45) Date of Patent: Feb. 17, 2015

(54) LIMITING CONTROL TRAFFIC IN A REDUNDANT GATEWAY ARCHITECTURE

(75) Inventors: Vedamurthy A. Joshi, Bangalore (IN); Sharath Sridhar, Bangalore (IN); Raja Krishnamoorthy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 916 days.

(21) Appl. No.: 12/639,361

(22) Filed: Dec. 16, 2009

(65) Prior Publication Data

US 2011/0141881 A1 Jun. 16, 2011

(51) Int. Cl.
*H04L 12/66* (2006.01)
*H04L 12/751* (2013.01)
*H04L 12/713* (2013.01)

(52) U.S. Cl.
CPC ............... *H04L 12/66* (2013.01); *H04L 45/02* (2013.01); *H04L 45/586* (2013.01)
USPC .......................................... 709/224; 370/219

(58) Field of Classification Search
CPC ............................. H04L 45/586; H04L 45/02
USPC .......................................... 370/219; 709/224
See application file for complete search history.

(56) References Cited

U.S. PATENT DOCUMENTS

| | | | | |
|---|---|---|---|---|
| 6,397,260 | B1 * | 5/2002 | Wils et al. | 709/238 |
| 7,076,696 | B1 * | 7/2006 | Stringer | 714/47.3 |
| 7,486,610 | B1 * | 2/2009 | Bhupalam et al. | 370/216 |
| 2003/0014540 | A1 * | 1/2003 | Sultan et al. | 709/240 |
| 2004/0213237 | A1 * | 10/2004 | Yasue et al. | 370/392 |
| 2005/0237946 | A1 * | 10/2005 | Borowski | 370/254 |
| 2007/0230472 | A1 * | 10/2007 | Jesuraj | 370/392 |
| 2008/0151882 | A1 * | 6/2008 | Sanjay et al. | 370/389 |
| 2009/0041037 | A1 * | 2/2009 | Yang et al. | 370/401 |
| 2009/0073989 | A1 * | 3/2009 | Cai et al. | 370/395.53 |
| 2010/0054241 | A1 * | 3/2010 | Shah et al. | 370/389 |

OTHER PUBLICATIONS

Hinden, Robert, et al., Virtual Router Redundancy Protocol, Request for Comment 3768, Network Working Group of Internet Engineering Task Force (Apr. 2004).*

* cited by examiner

*Primary Examiner* — Benjamin Lamont
(74) *Attorney, Agent, or Firm* — Harrity & Harrity, LLP (57) ABSTRACT

Control traffic in a virtual LAN (VLAN) may be reduced. In one implementation, a network device may implement one of a plurality of redundant gateway devices in a virtual router that includes one or more other network devices, where the network device and the one or more other network devices are associated with a first address that corresponds to the virtual router. The network device may filter egress traffic to drop egress traffic that includes a particular destination address and that is at an interface of the device that is not needed to deliver control traffic.

21 Claims, 6 Drawing Sheets

LIMITING CONTROL TRAFFIC IN A REDUNDANT GATEWAY ARCHITECTURE

BACKGROUND

Computing and communication networks typically include devices, such as routers, switches or gateways, which transfer or switch data, such as packets, from one or more sources to one or more destinations. A network switch or router, in particular, may include a networking device that connects network segments and computing devices.

Different network subnets in a network may be logically partitioned into, for example, a local area network (LAN) or virtual LAN (VLAN). Members of a particular subnet may use an agreed upon set of protocols to communicate with one another. Gateway devices may act as interfaces between subnets and may convert protocols between the different network subnets.

To minimize the likelihood of failure of a gateway device, a redundant set of gateway devices may be used, in which the set of gateway devices may include a number of physical gateway devices that operate as a single logical gateway device. When one of the physical gateway devices fails, a backup gateway device in the redundant set may assume the gateway functions that were being performed by the failed device. Ideally, the switchover operation between the failed gateway device and the backup gateway device should be as transparent as possible to the rest of the subnet.

To coordinate the operation of the logical gateway device, control traffic may be periodically communicated between the redundant set of gateway devices. For example, for gateway devices in a VLAN RVI (routed VLAN interface), multicast packets may be used to periodically broadcast, to other device in the VLAN, control traffic that includes status information relating to the redundant set of gateway devices. To maximize performance of the network, it may be desirable to minimize the amount of control traffic.

SUMMARY

In one implementation, a network device may include a number of interfaces associated with communication links through which the network device communicates. The network device may further include logic to control the network device to act as one of a plurality of physical devices in a virtual router that implements a redundant gateway for a VLAN, where the network device is a member of the VLAN; logic to receive an identification of one or more of the interfaces that correspond to inactive virtual router interfaces, where each inactive virtual router interface represents one of the interfaces of the network device that is not needed to deliver virtual router control traffic to other ones of the physical devices in the virtual router; and a filter to drop egress traffic at the identified one or more of the interfaces when the egress traffic corresponds to control traffic for the virtual router.

In another possible implementation, a method may include controlling, by a network device, the network device to implement one of a number of redundant gateway devices in a virtual router that includes one or more other network devices, where the network device and the one or more other network devices are associated with a first address that corresponds to the virtual router. The method may further include receiving, by the network device, identification of one or more of a number of interfaces of the network device that are not needed to deliver control traffic for the virtual router; and filtering egress traffic for the network device at each of the identified one or more of the interfaces to drop the egress traffic when the egress traffic includes a destination address that matches the first address.

In another possible implementation, a network device may include a number of interfaces associated with communication links through which the network device communicates; logic to control the network device to act as one of a number of physical devices in a virtual router implemented using Virtual Router Redundancy Protocol (VRRP) to redundantly implement a gateway for a VLAN, where the network device is a member of the VLAN; logic to receive an identification of one or more of the interfaces that correspond to inactive virtual router interfaces, where each inactive virtual router interface represents one of the interfaces of the network device that is not needed to deliver virtual router control traffic to other ones of the physical devices in the virtual router; and a filter programmed to drop egress traffic at the identified one or more of the plurality of interfaces when the egress traffic corresponds to traffic that includes a destination media access control (MAC) address that matches a predetermined value.

In another possible implementation, a device may include means to control the network device to implement one of a plurality of redundant gateway devices in a virtual router that includes one or more other network devices, where the network device and the one or more other network devices are associated with a first address that corresponds to the virtual router. The device may further include means to receive identification of one or more of a plurality of interfaces of the network device that are not needed to deliver control traffic for the virtual router; and means to filter egress traffic for the network device at each of the identified one or more of the plurality of interfaces to drop the egress traffic when the egress traffic includes a destination address that matches the first address.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

A VLAN is described herein in which a redundancy protocol is used to enable a number of physical gateway devices to redundantly perform gateway service for the VLAN. Interfaces, on the physical gateway devices, that are not needed to transmit control traffic for the redundancy protocol may be determined. A filter may then be applied to each of these interfaces. In one implementation, the filter may drop egressing traffic that is destined for a particular media access control (MAC) address.

Exemplary System Overview

Figure 1:
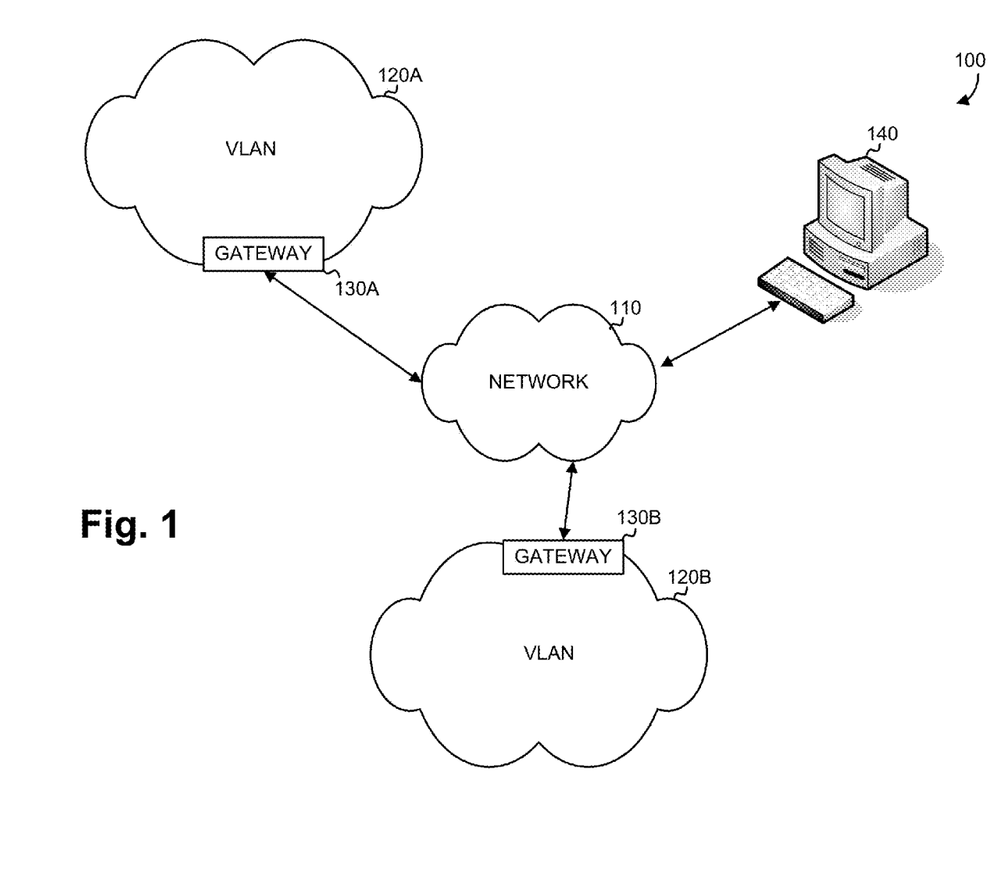
FIG. 1 is a diagram of an exemplary system in which concepts described herein may be implemented.

FIG. 1 is a diagram of an exemplary system 100 in which concepts described herein may be implemented. System 100 may include a number of physical or logical networks. As particularly shown, system 100 may include a network 110 connected to one or more additional networks, such as virtual local area networks (VLANs) 120A and 120B (collectively referred to as VLANs 120) and a computing device 140. VLANs 120 may each, for example, include one or more computing devices that are logically organized into a LAN. In one exemplary implementation, VLANs 120 may include network devices, such as switches and routers, that are designed to serve as a switching network.

Network 110 may generally include one or more types of networks. For instance, network 110 may include a wide area network (WAN), such as a cellular network, a satellite network, the Internet, or a combination of these networks that that are used to transport data. Although shown as a single element in FIG. 1, network 110 may include a number of separate networks that function to provide services to VLANs and computing devices, such as computing device 140. Network 110 may be implemented using a number of network devices that may include, for example, routers, switches, gateways, or other devices.

VLANs 120 may each include a number of computing devices, such as, for example, client computing stations, network devices, or server computing devices. VLANs 120A and 120B may each particularly include gateways 130A and 130B, respectively (collectively referred to as gateways 130). Gateways 130 may generally act as an interface between networks. For instance, gateway 130A may act as an interface between VLAN 120A and network 110. Each gateway 130 may, for instance, convert between protocols implemented by a VLAN 120 and network 110. In practice, each gateway 130 may be implemented by a router, switch, or other network device.

Computing device 140 may include, for example, a laptop or personal computer connected to network 110. Alternatively, computing device 140 may include a mobile device, such as a cell phone, etc.

In the exemplary system shown in FIG. 1, three networks 110, 120A, and 120B, and one computing device 140 are shown. In other implementations, system 100 may include additional, fewer, different, or differently arranged networks and/or devices.

Figure 2:
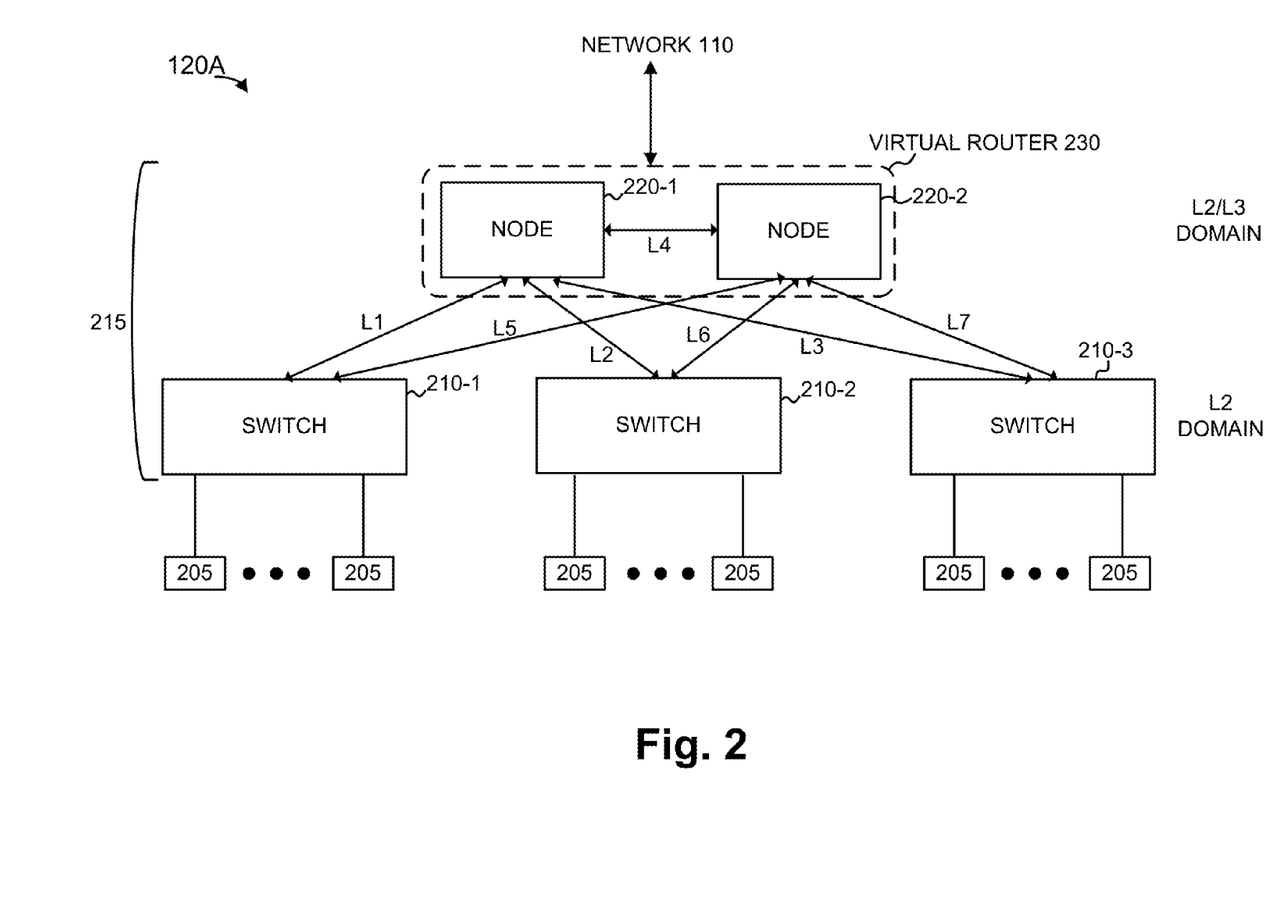
FIG. 2 is a diagram of an exemplary implementation of one of the VLANs shown in FIG. 1.

FIG. 2 is a diagram illustrating an exemplary implementation of one of VLANs 120, such as VLAN 120A. VLAN 120A may include a number of client computing or networking devices 205. Each device 205 may be for example, a client or server computing device. Devices 205 may be connected to one another and to external VLANs or other networks (e.g., network 110) through a switching system 215.

Switching system 215 may include one or more switches 210-1 through 210-3 (collectively, switches 210) and one or more nodes 220-1 and 220-2 (collectively, nodes 220). Switches 210 and nodes 220 may be hierarchically arranged so that each switch 210 is connected to each node 220. Nodes 220 may also be connected to one another. Links between switches 210 and nodes 220 are illustrated in FIG. 2 as connecting lines labeled L1 (link one) through L7 (link 7). The number of switches 210 and nodes 220 shown in FIG. 2 is exemplary. It can be appreciated that additional or fewer switches 210 or nodes 220 may be used.

Each switch 210 may be a Layer 2 switch in the OSI (Open System Interconnect) network model and each node 220 may be a Layer 2/Layer 3 (i.e., each node 220 may perform both Layer 2 and Layer 3 functions) switch or router. Switches 210 may be edge switches designed to connect to computing devices, such as devices 205. In one implementation, each switch 210 may include, for example, forty-eight (48) ports designed to connect to devices 205. Each switch 210 may also include a number of ports designed to connect to nodes 220. The upstream ports to nodes 220 may support higher bandwidth links than the links to devices 205.

Nodes 220 may include devices that can implement both routing and switching functions. One or more of nodes 220 may also act as a gateway to external networks or VLANs.

Nodes 220 may be configured to act as a gateway, such as one of gateways 130, to network 110. In one implementation, multiple nodes 220 may be configured as a virtual router 230 that acts as a gateway for VLAN 120A. The multi-node virtual router may be assigned a single Internet Protocol (IP) address that is the gateway address for VLAN 120A. Further, one node 220 in virtual router 230 may be designed as the master node, which will act as the actual gateway device, while the other nodes 220 may be the backup devices. Devices 205 may send packets that are destined to an external network, such as network 110, to this address. If the master node in virtual router 230 fails, a backup node 220 may take over as the new master node for virtual router 230. From the point of view of devices 205, the failure of the first master node should not be noticed, as the devices 205 can continue to send out-of-VLAN data units to use the same gateway address.

As an example of the operation of VLAN 120A, consider the transmission of a data unit, such as a packet, sent between two devices 205 that are both connected to switch 210-1. The data unit may be directly forwarded at switch 210-1 to its destination device 205 based on a lookup of a MAC address. For a data unit sent between two devices 205 that are connected to different switches 210, such as switches 210-1 and 210-2, the data unit may be forwarded from switch 210-1 to one of nodes 220, such as node 220-1, and then forwarded from node 220-2 to switch 210-2. Switch 210-2 may finally forward the data unit to the destination device 205. Finally, consider a device 205 that transmits a data unit to an external network or VLAN. The data unit may progress through one of switches 210, to one of nodes 220 (i.e., the node 220 that is acting as the master), which may forward the data unit outside of VLAN 120A, such as to network 110.

A virtual router protocol, such as the known Virtual Router Redundancy Protocol (VRRP), may be used to implement virtual router 230. VRRP is a protocol designed to increase the availability of the default gateway servicing hosts. The increased reliability may be achieved by advertising virtual router 230 (an abstract representation of master and backup routers acting as a group) as a default gateway instead of one physical router. Two or more nodes may be configured to stand for the virtual router, with only one doing the actual routing at any given time. If the current physical node that is routing the data on behalf of the virtual router fails, a backup node may automatically replace it.

In one implementation, virtual router 230 may be particularly implemented using VRRP configured on a VLAN RVI (routed VLAN interface). For example, an RVI interface may be setup on nodes 220 for each of links L1 through L7. VRRP may be configured on these RVI interfaces.

Exemplary Device Overview

Figure 3:
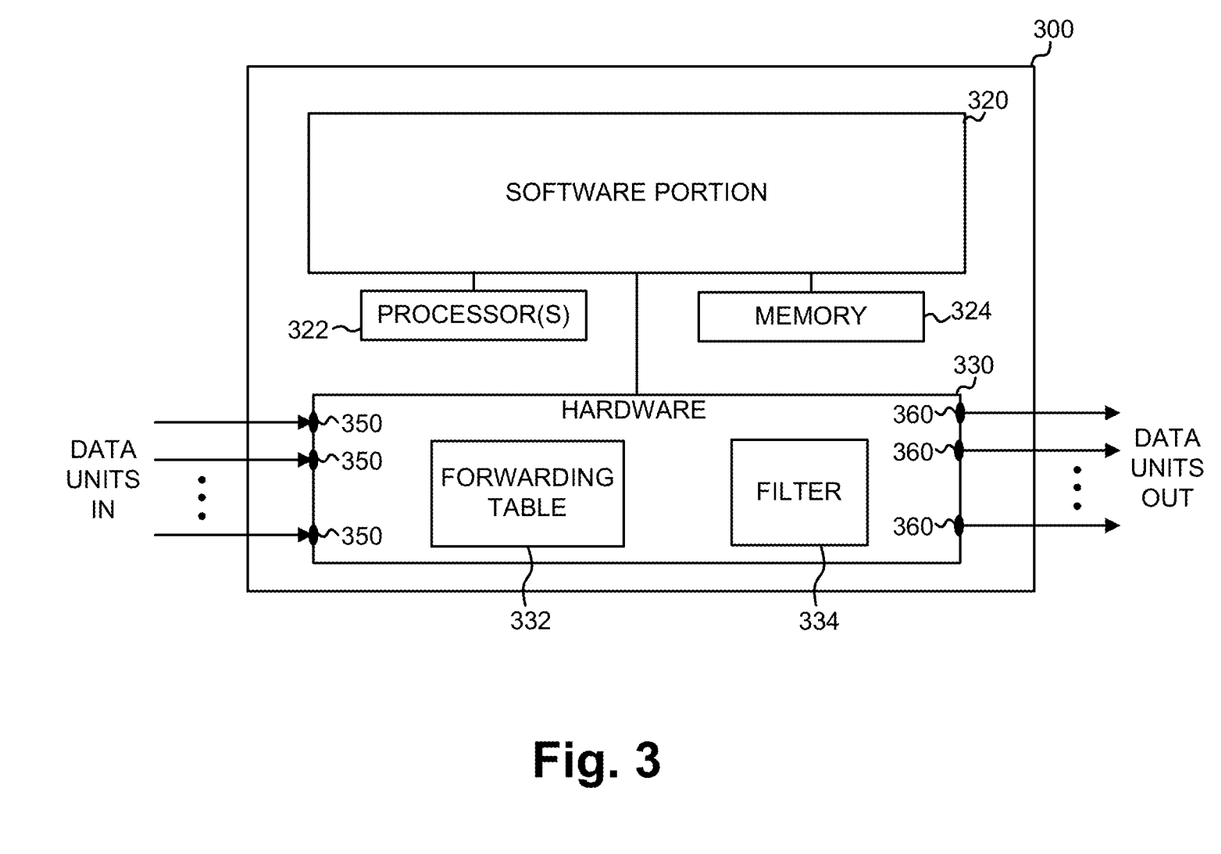
FIG. 3 is a diagram illustrating an exemplary network switching/routing device that may correspond to a device shown in FIG. 2.

FIG. 3 is a diagram illustrating an exemplary network switching/routing device 300, which may correspond to one of switches 210 or nodes 220.

Switching/routing device 300, when implementing switches 210, may perform network switching at the Layer 2 network layer. Switching at the Layer 2 layer may generally include looking up destination addresses, such as addresses specified by a MAC address and/or a virtual local area network (VLAN) identifier, associated with an incoming data unit. The lookup may determine the appropriate output port or link for the data unit. The lookup may be based on a forwarding table that is updated based on one or more link layer protocols executed by switching/routing device 300.

Switching/routing device 300, when implementing nodes 220, may perform network switching at the Layer 2 and/or Layer 3 network layer. When performing network switching at the Layer 3 network layer, switching/routing device 300 may implement a router. The router may, for example, execute routing protocols to select paths over which data units will travel.

As shown in FIG. 3, switching/routing device 300 may include a software portion 320 and a hardware portion 330. Software portion 320 may include software designed to control switching/routing device 300. Software portion 320 may, for example, implement an operating system for switching/routing device 300 and may execute processes designed to implement the network protocols used by switching/routing device 300. Software portion 320 may control hardware portion 330 and provide an interface for user configuration of switching/routing device 300. In general, software portion 320 may implement the functions of switching/routing device 300 that are either related to control or that can be implemented in the "slow path" through switching/routing device 300. Software portion 320, although shown as a single abstract block 320 in FIG. 3, may be implemented through, for example, one or more general purpose processors 322 and one or more computer memories 324. Processors 322 may include processors, microprocessors, or other types of processing logic that may interpret and execute instructions. Computer memories 324 (also referred to as computer-readable media herein) may include random access memory (RAM), read-only memory (ROM), or another type of dynamic or static storage device that may store information and instructions for execution by processors 322.

Hardware portion 330 may include circuitry for efficiently processing data units received by switching/routing device 300. Hardware portion 330 may include, for example, logic, such as an application specific integrated circuit (ASIC), a field programmable gate array (FPGA), a content-addressable memory (CAM) and/or a ternary content-addressable memory (TCAM). Hardware portion 330 may, for example, receive incoming data units, extract header information from the data units, and process the data units based on the extracted header information.

Hardware portion 330 may particularly include a forwarding table 332 and a filter 334. Forwarding table 332 may be used to lookup the appropriate output port for incoming data units. Forwarding table 332 may be updated based on the network protocols implemented by software portion 320. Based on the result of the lookup in forwarding table 332, the data unit may be switched to the appropriate output port of switching/routing device 300. Filter 334 may perform filtering of network traffic passing through switching/routing device 300 and may perform actions, such as to deny or permit passage of the traffic based on rules defined for switching/routing device 300. The filtering rules may be implanted using, for example, a CAM or TCAM.

Switching/routing device 300 may also include ports for receiving and transmitting data units. Input ports 350 and output ports 360 are particularly shown for switching/routing device 300.

It can be appreciated that although switching/routing device 300 is shown as including a software portion 320 and a hardware portion 330, switching/routing device 300 may, in some implementations, be implemented entirely through hardware.

Operation of Switching System

As previously mentioned, virtual router 230 may be implemented using VRRP. In VRRP, a master node in virtual router 230 (e.g., node 220-1) may periodically transmit control traffic to members of VLAN 120A. The control traffic may include "advertisement" data units, such as packets, that inform the other devices in VLAN 120A that the master is still functioning. These advertisements may be, for example, transmitted at one second intervals as multicast packets. The advertisement packets may be sent on all member interfaces of VLAN 120A. In FIG. 2, for example, if node 220-1 is the master node, the advertisement packets may be sent on the VLAN interfaces corresponding to links L1, L2, L3, and L4.

Consistent with aspects described herein, the master node in a VRRP virtual router may install filters at its VLAN interfaces that do not benefit from advertisement packets (e.g., in FIG. 2, the interfaces corresponding to L1, L2, and L3). Each filter may block the advertisement packets.

Figure 4:
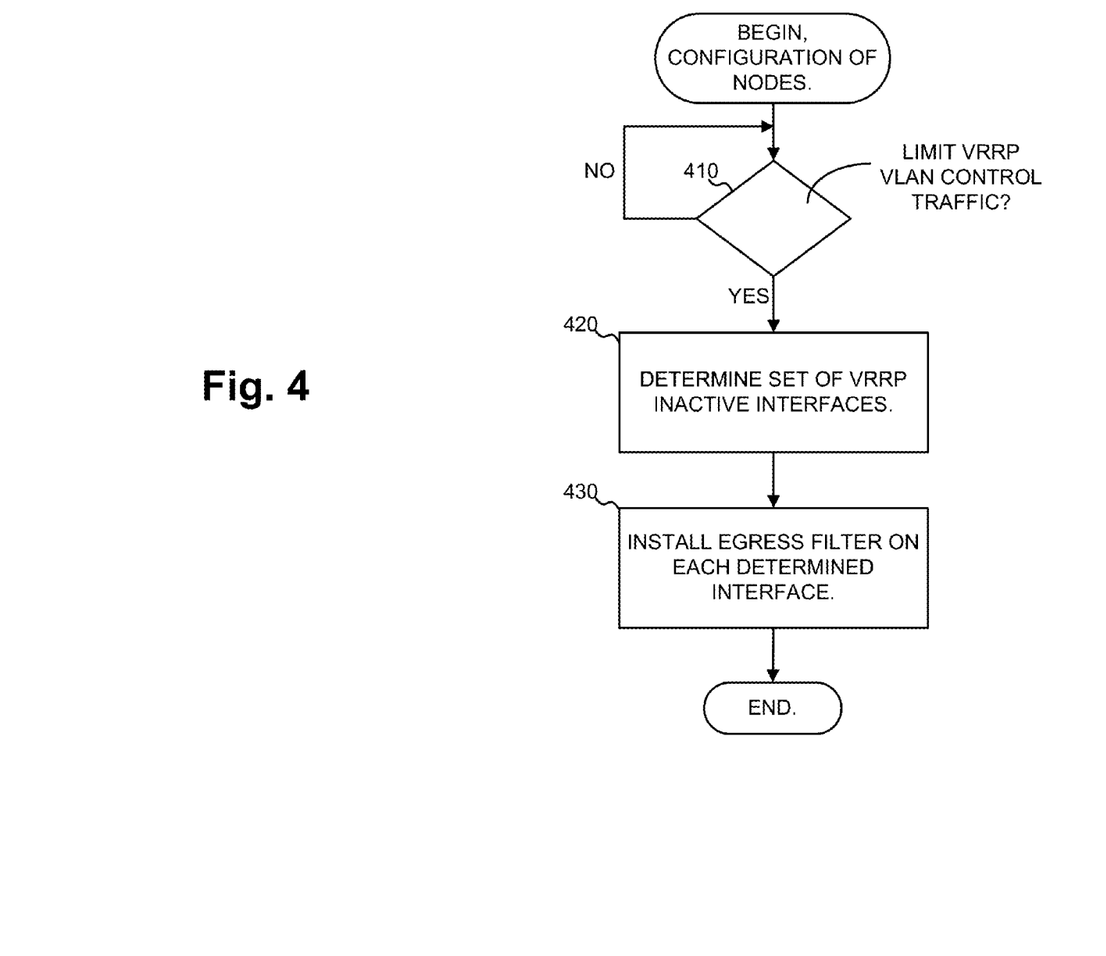
FIG. 4 is a flow chart illustrating exemplary operations for configuring a virtual router to limit control traffic.

FIG. 4 is a flow chart illustrating exemplary operations for configuring virtual router 230 to limit VRRP control traffic. The operations shown in FIG. 4 may be performed by one or more of nodes 120, potentially in response to interaction with an administrator.

It may be determined to configure virtual router 230 to limit VRRP VLAN control traffic (block 410). In one implementation, an administrator may decide to limit VRRP VLAN control traffic. In an alternative implementation, virtual router 230 may automatically limit VRRP VLAN control traffic unless explicitly configured by the administrator not to do so.

The set of VRRP inactive interfaces associated with virtual router 230 may be determined (block 420). In one implementation, an administrator may determine the set of VRRP inactive interfaces, such as by inspection of nodes 220 in virtual router 230.

For each VRRP inactive interface determined in block 420, the node 220 associated with the interface may install an egress filter (block 430). The egress filter may be designed to block certain VRRP control traffic (i.e., VRRP advertisements). For instance, filter 334 may be programmed to block (drop) packets associated with VRRP traffic on the set of egress interfaces. The VRRP protocol may require that advertisement control traffic have a certain specified destination MAC address, such as the MAC address 01:00:5e:00:00:12. Filter 334 may thus be programmed to drop all egress packets that have this destination MAC address and that are associated with the interfaces determined in block 420. Alternatively, other fields may be used to identify VRRP advertisement control traffic so that the traffic may be dropped. For example, physical nodes 220 acting as part of virtual router 230 may communicate with themselves using multicast packets having a specific IP address (i.e., 224.0.0.18). Filter 334 may thus be programmed to drop all data units that have this destination IP address.

Figure 5:
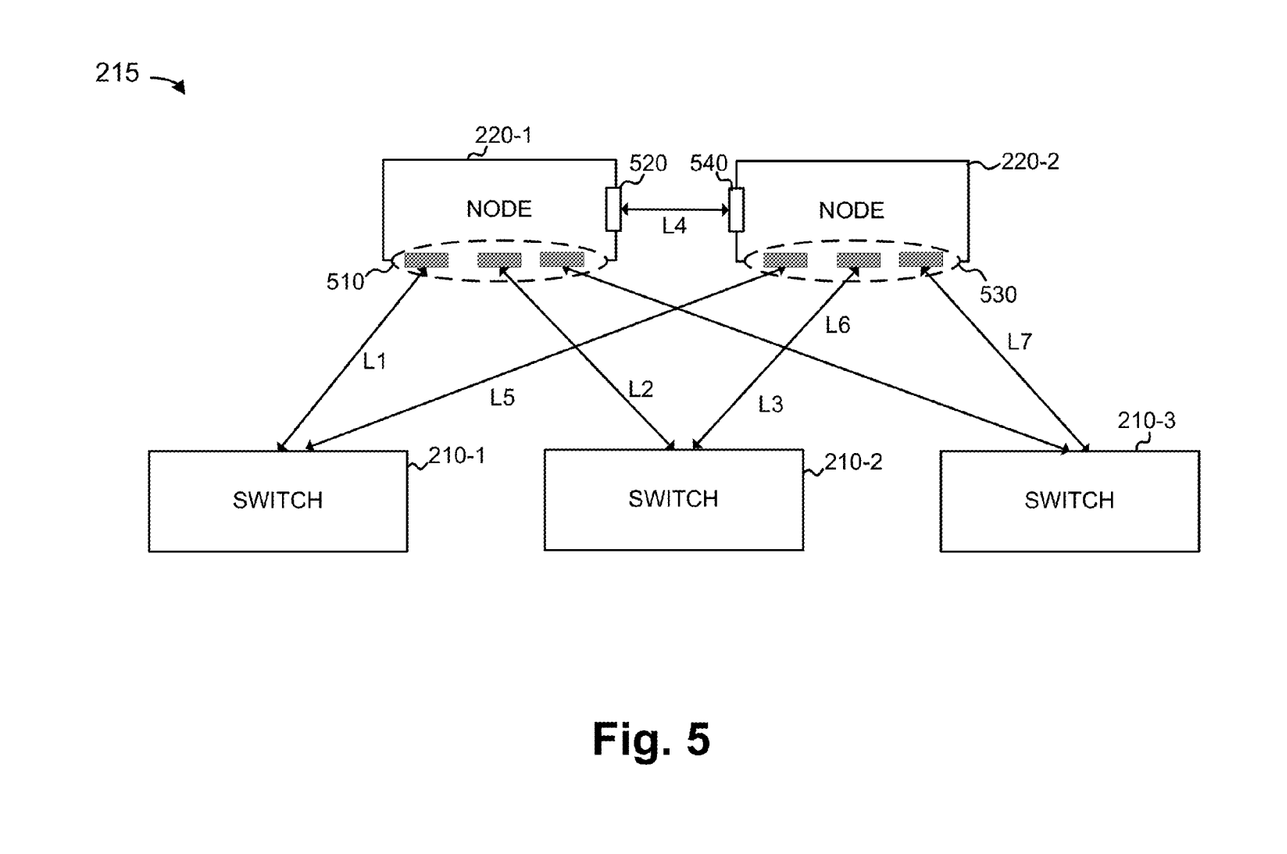
FIG. 5 is a diagram conceptually illustrating the operation of egress filters installed in nodes of a virtual router.

FIG. 5 is a diagram conceptually illustrating the operation of the egress filters installed in block 430. Switching system 215 of VLAN 120A is shown in FIG. 5. Interfaces for nodes 220-1 and 220-2 are particularly illustrated in FIG. 5 as shaded (VRRP inactive interface) or unshaded (VRRP active interface) rectangles. In particular, for node 220-1, interfaces 510 may correspond to links L1, L2, and L3, respectively, and may be the set of interfaces for node 220-1 that correspond to VRRP inactive interfaces. The links corresponding to interfaces 510 may lead to switches 210. Switches 210 are not part of virtual router 230 and do not provide a needed path to connect nodes in virtual router 230, and thus may be considered to be associated with the VRRP inactive interfaces for node 220-1. Interface 520, which corresponds to the interface for node 220-2 in virtual router 230, is needed to connect the nodes in virtual router 230 and may thus be determined to be a VRRP active interface. Similarly, for node 220-2, interfaces 530 (corresponding to links L5, L6, and L7) may be determined to correspond to the VRRP inactive interfaces and interface 540 may be determined to correspond to the VRRP active interface. VRRP control traffic may be blocked at interfaces 510 and 530 as it is leaving nodes 220-1 and 220-2. Blocking this control traffic may reduce traffic in switching system 215, potentially without compromising the high availability of virtual router 230.

The egress filters installed on nodes 220 of virtual router 230 may be installed using a number of possible techniques. In one such technique, software executing from a remote computing device, such as computing device 140, may provide an administrator with a graphical interface that may assist the administrator in setting the VRRP inactive interfaces and installing the filters. In another possible implementation, node 220 of virtual router 230 may automatically install the egress filters in response to command from the administrator that VRRP VLAN control traffic is to be limited. In yet another possible implementation, the administrator may use a command-line interface (CLI) to directly enter or upload configuration information or a configuration file to each of nodes 220. In this situation, nodes 220 may support a command, such as a "no-vrrp-advertisement" command that causes the node to install an appropriate filter at each VRRP inactive interface.

Figure 6:
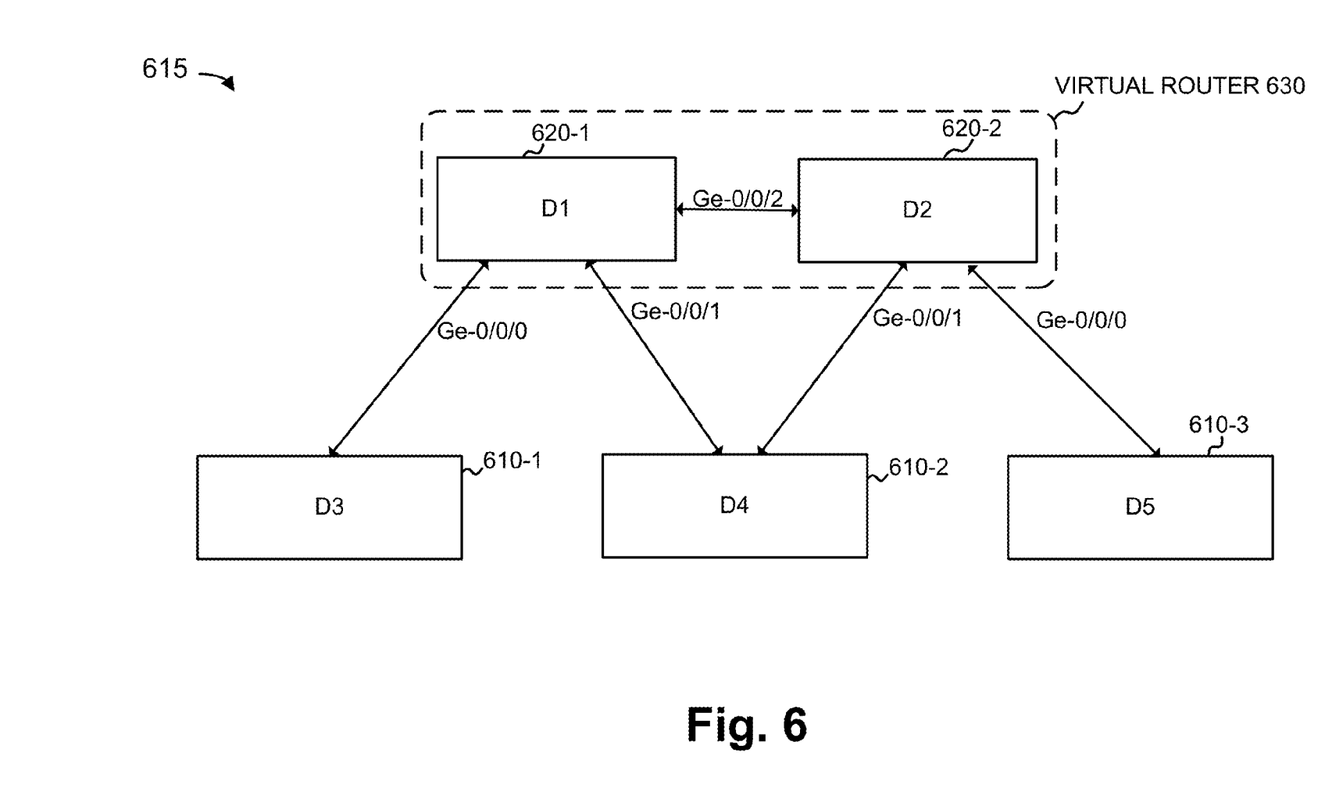
FIG. 6 is a diagram illustrating another exemplary switching system.

FIG. 6 is a diagram illustrating another exemplary switching system 615. Tables I-IV, below, illustrate exemplary configuration information that may be used to configure switching system 615 to limit VRRP control traffic.

Switching system 615 may include two nodes, node 620-1 (D1) and node 620-2 (D2), that implement virtual router 630. In this implementation, switches 610-1 (D3) and 610-3 (D5) may each connect to one of nodes 620 and switch 610-2 (D4) may connect to both nodes 620 using the illustrated links. Further, nodes 620-1 and 620-2 may directly connect to one another. Labels for each of the interfaces in nodes 620 are also shown in FIG. 6. More specifically, node 620-1 includes interfaces Ge-0/0/0 and Ge-0/0/1, which connect to D3 and D4, respectively. Both nodes 620-1 and 620-2 include an interface Ge-0/0/2 that connects to one another. Node 620-2 includes interfaces Ge-0/0/0 and Ge-0/0/1, which connect to D4 and D5, respectively.

Table I defines the interface configuration of node 620-1. Table II defines the interface configuration of node 620-2.

TABLE I

NODE D1

```
interfaces {
    ge-0/0/0 {
        unit 0 {
            family ethernet-switching;
        }
    }
    ge-0/0/1 {
        unit 0 {
            family ethernet-switching;
        }
    }
    ge-0/0/2 {
        unit 0 {
            family ethernet-switching;
        }
    }
    vlan {
        unit 1 {
            family inet {
                address 192.168.1.1/24 {
                    vrrp-group 27 {
                        virtual-address 192.168.1.15;
                    }
                }
            }
        }
    }
}
vlans {
    v1 {
        vlan-id 10;
        l3-interface vlan.1;
        interface ge-0/0/0;
        interface ge-0/0/1;
        interface ge-0/0/2;
    }
}
```

TABLE II

NODE D2

```
interfaces {
    ge-0/0/0 {
        unit 0 {
            family ethernet-switching;
        }
    }
    ge-0/0/1 {
        unit 0 {
            family ethernet-switching;
        }
    }
    ge-0/0/2 {
        unit 0 {
            family ethernet-switching;
        }
    }
    vlan {
        unit 1 {
            family inet {
                address 192.168.1.2/24 {
                    vrrp-group 27 {
                        virtual-address 192.168.1.15;
                    }
                }
            }
        }
    }
}
vlans {
    v1 {
        vlan-id 10;
        l3-interface vlan.1;
        interface ge-0/0/0;
```

TABLE II-continued

NODE D2

```
        interface ge-0/0/1;
        interface ge-0/0/2;
        }
}
```

Nodes 620-1 may be configured using, for example, the command-line interface commands shown in Table III. Nodes 620-2 may be configured using, for example, the command-line interface commands shown in Table IV. The commands shown in Tables III and IV may use exemplary syntax designed to conceptually illustrate configuration of nodes 620-1 and 620-2. As particularly shown, the command "no-vrrp-advertisement," followed by a list of interfaces, is used to instruct each node to install an appropriate filter at the egress interfaces in the list. As previously discussed, the filter may, for example, block all outgoing data units having a certain destination MAC address, such as the address 01:00:5e:00:00:12.

TABLE III

NODE D1 CONFIGURATION COMMANDS

```
protocols {
    no-vrrp-advertisement {
        interface ge-0/0/0;
        interface ge-0/0/1;
    }
}
```

TABLE IV

NODE D2 CONFIGURATION COMMANDS

```
protocols {
    no-vrrp-advertisement {
        interface ge-0/0/0;
        interface ge-0/0/1;
    }
}
```

Although the technique for limiting control traffic, as discussed above, was generally presented with respect to implementation of a virtual router using VRRP, the discussed techniques could alternatively be applied to limit control traffic for protocols other than VRRP. For example, the above-discussed techniques may be applied to protocols such as Open Shortest First Path (OSPF) or a routing protocol such as Routing Information Protocol (RIP).

Conclusion

As described above, a VLAN that includes a virtual router may reduce the bandwidth of control traffic in the VLAN. The reduction in control traffic may be achieved by identifying interfaces at nodes of the virtual router that are not needed when multicast broadcasting the control traffic. Egress filters may be applied at these interfaces. The filters may be structured to block certain MAC or IP addresses associated with the virtual router protocol.

While a series of operations has been described with regard to FIG. 4, the order of the operations may be varied in other implementations consistent with the invention.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A network device comprising:
   a plurality of interfaces associated with communication links through which the network device communicates; and
   one or more processors to:
      control the network device to act as one of a plurality of physical devices in a virtual router that implements a redundant gateway for a virtual local area network (VLAN),
         the network device being a member of the VLAN;
      determine one or more inactive interfaces, of the plurality of interfaces, that are not needed to deliver control traffic from the network device to one or more other network devices of the plurality of physical devices in the virtual router,
         the control traffic including information that informs the one or more other network devices that the network device is functioning as a master of the virtual router, and
         one or more other interfaces, of the plurality of interfaces, being needed to deliver the control traffic from the network device to the one or more other network devices of the plurality of physical devices in the virtual router; and
      drop egress traffic at the one or more inactive interfaces when the egress traffic corresponds to the control traffic.

2. The network device of claim 1, where the virtual router includes a virtual router implemented using Virtual Router Redundancy Protocol (VRRP).

3. The network device of claim 1, where, when dropping the egress traffic at the one or more inactive interfaces, the one or more processors are to:
   determine that the egress traffic includes a destination media access control (MAC) address that matches a particular MAC address, and
   drop the egress traffic after determining that the destination MAC address matches the particular MAC address.

4. The network device of claim 1, where, when dropping the egress traffic at the one or more inactive interfaces, the one or more processors are to:
   determine that the egress traffic includes an Internet Protocol (IP) address that matches a particular address, and drop the egress traffic after determining that the IP address matches the particular address.

5. The network device of claim 1, where, when dropping the egress traffic, the one or more processors are to:
receive a command entered by an administrator at a command line interface of the network device, and
drop the egress traffic based on the command.

6. The network device of claim 1, where the network device includes a router.

7. A method comprising:
controlling, by a network device, the network device to implement one of a plurality of redundant gateway devices in a virtual router,
the plurality of redundant gateway devices including the network device and one or more other network devices, and
the network device and the one or more other network devices being associated with a particular address that corresponds to the virtual router;
determining, by the network device, one or more inactive interfaces, of a plurality of interfaces of the network device, that are not needed to deliver control traffic from the network device to the one or more other network devices,
the control traffic including information that informs the one or more other network devices that the network device is functioning as a master of the virtual router, and
one or more other interfaces, of the plurality of interfaces, being needed to deliver the control traffic from the network device to the one or more other network devices; and
drop egress traffic at each of the one or more inactive interfaces when the egress traffic includes a destination address that matches the particular address.

8. The method of claim 7, where dropping the egress traffic:
determining that the egress traffic corresponds to the control traffic, and
dropping the egress traffic based on determining that the egress traffic corresponds to the control traffic.

9. The method of claim 7, where the virtual router includes a virtual router for a virtual local area network (VLAN).

10. The method of claim 7, where the particular address includes a destination media access control (MAC) address.

11. The method of claim 7, where the particular address includes an Internet Protocol (IP) address.

12. The method of claim 7, further comprising:
receiving a command from an administrator, via a command line interface, to implement filtering; and
programming, based on the command, a filter, of the network device, to filter the egress traffic,
the egress traffic being dropped based on the filter.

13. A network device comprising:
a plurality of interfaces associated with communication links through which the network device communicates; and
one or more processors to:
control the network device to act as one of a plurality of physical devices in a virtual router implemented using Virtual Router Redundancy Protocol (VRRP),
the network device being a member of a virtual local area network (VLAN), and
the plurality of physical devices including the network device and one or more other network devices;
identify one or more inactive interfaces, of the plurality of interfaces, that are not needed to deliver control traffic from the network device to the one or more other network devices,
the control traffic including information that informs the one or more other network devices that the network device is functioning as a master of the virtual router; and
configure a filter to drop egress traffic at the one or more inactive interfaces when the egress traffic corresponds to the control traffic.

14. The network device of claim 13, where, when configuring the filter, the one or more processors are further to configure the filter to drop the egress traffic after determining that the egress traffic is the control traffic.

15. The network device of claim 13, where the one or more processors are further to:
determine, based on the filter, that the egress traffic includes a destination media access control (MAC) address that matches a particular value, and
drop the egress traffic after determining that the destination MAC address matches the particular value.

16. The network device of claim 13, where the one or more processors are further to:
determine, based on the filter, that the egress traffic includes an Internet Protocol (IP) address that matches a particular address, and
drop the egress traffic after determining that the IP address matches the particular address.

17. A non-transitory computer-readable medium storing instructions, the instructions comprising:
one or more instructions that, when executed by at least one processor of a network device, cause the at least one processor to:
control the network device to act as one of a plurality of redundant gateway devices in a virtual router,
the plurality of redundant gateway devices including the network device and one or more other network devices, and
the network device and the one or more other network devices being associated with a particular address that corresponds to the virtual router;
determine one or more inactive interfaces, of a plurality of interfaces of the network device, that are not needed to deliver control traffic from the network device to the one or more other network devices,
the control traffic including information that informs the one or more other network devices that the network device is functioning as a master of the virtual router, and
one or more other interfaces, of the plurality of interfaces, being needed to deliver the control traffic from the network device to the one or more other network devices; and
configure one or more filters, at the one or more inactive interfaces, to drop egress traffic when the egress traffic includes a destination address that matches the particular address,
the dropped egress traffic including the control traffic.

18. The non-transitory computer-readable medium of claim 17, where the particular address includes a destination media access control (MAC) address or an Internet Protocol (IP) address.

19. The non-transitory computer-readable medium of claim 17, where the one or more instructions to filter the egress traffic include:

one or more instructions that, when executed by the at least one processor, cause the at least one processor to:
- determine that the destination address matches the particular address,
- determine that the egress traffic is the control traffic based on determining that the destination address matches the particular address, and
- drop the egress traffic after determining that the egress traffic is the control traffic.

20. The non-transitory computer-readable medium of claim 17, where the one or more instructions to configure the one or more filters include:
one or more instructions that, when executed by the at least one processor, cause the at least one processor to:
- receive a command to implement filtering of the control traffic, and
- configure the one or more filters based on the command.

21. The non-transitory computer-readable medium of claim 17, where the one or more instructions to determine the one or more inactive interfaces comprise:
one or more instructions that, when executed by the at least one processor, cause the at least one processor to:
- determine a selection by an administrator to limit the control traffic, and
- determine, based on determining the selection by the administrator to limit the control traffic, the one or more inactive interfaces that are not needed to deliver the control traffic from the network device to the one or more other network devices.

* * * * *